United States Patent [19]

Kanemitsu

[11] Patent Number: 4,879,500
[45] Date of Patent: Nov. 7, 1989

[54] CONTROLLER FOR MAGNETIC BEARING SYSTEM

[75] Inventor: Yoichi Kanemitsu, Kanagawa, Japan

[73] Assignees: Ebara Research Co., Ltd., Fujisawa; Ebara Corporation, Tokyo, both of Japan

[21] Appl. No.: 286,013

[22] Filed: Dec. 19, 1988

[51] Int. Cl.⁴ .......................................... G05D 23/275
[52] U.S. Cl. .................................. 318/632; 310/90.5; 104/281; 104/284
[58] Field of Search ....................... 318/632; 310/90.5; 104/281, 284

[56] References Cited

U.S. PATENT DOCUMENTS 4,473,259 9/1984 Goldowaky ..................... 104/284 X
4,652,820 3/1987 Maresca ......................... 310/90.5 X

OTHER PUBLICATIONS

"The Application of Active Magnetic Bearings to a Natural Gas Pipeline", ASME Paper 86-GT-61, E. G. Forster, P. Eng. et al.
"Effect of Control Algorithms on Magnetic Journal Bearing Properties", ASME Paper 86-GT-54, R. R. Humphris et al.
"The Active Magnetic Bearing Optimum Control of Machine Vibrations" ASME Paper 85-TG-221, Helmut Habermann et al.

Primary Examiner—William M. Shoop, Jr.
Assistant Examiner—Saul M. Bergmann
Attorney, Agent, or Firm—Armstrong, Nikaido, Marmelstein, Kubovcik & Murray

[57] ABSTRACT

A controller for a magnetic bearing system which controls the magnetic attraction force acting between a rotor yoke rigidly secured to a rotary shaft and a pair of electromagnet stators rigidly secured to a casing on the basis of a signal output from a displacement sensor which measures relative displacement between the rotary shaft and the casing. The signal output from the displacement sensor is input to a compensation circuit. The signal output from the compensation circuit is input to both the non-inverting input terminal of one operational amplifier and the inverting input terminal of the other operational amplifier. An exciting coil bias voltage is input to the respective inverting input terminals of the two operational amplifiers.

5 Claims, 5 Drawing Sheets $k_3 > 0$ $k_3 < 0$ $k_3 = 0$

CONTROLLER FOR MAGNETIC BEARING SYSTEM

BACKGROUND OF THE INVENTION

The present invention relates to a controller for a magnetic bearing which is used as a radial bearing or a thrust bearing in turbomachinery, that is, a magnetic bearing of the type having a rotor yoke rigidly secured to a rotary shaft, a pair of electromagnet stators rigidly secured to a casing with a minute gap provided between the same and the rotor yoke, each stator being provided with an exciting coil for generating magnetomotive force, and a displacement sensor for measuring relative displacement between the rotary shaft and the casing, wherein magnetic attraction is caused to act between the rotor yoke and the pair of electromagnet stators on the basis of a signal output from the displacement sensor, thereby supporting the rotary shaft in free space.

A magnetic bearing system having a controller according to a prior art will first be explained with reference to FIGS. 3 and 4.

FIG. 3 is a vertical sectional view showing the structure of a spindle which is supported by a conventional quinaxial control magnetic bearing system that employs electromagnets (i.e., one type of bearing system wherein the motion of the spindle is controlled in five different directions).

Referring to FIG. 3, a rotary shift 1 is driven by an electric motor which has a motor stator 8 and a motor rotor 9 which are disposed in the central portion of a casing 7, and the rotary shaft 1 is supported by two radial magnetic bearings disposed at both sides, respectively, of the motor and a thrust magnetic bearing which is adjacent to one of the radial magnetic bearings. Each of the radial magnetic bearings comprises a pair of radial bearing stators 3 rigidly secured to the casing 7 and each is provided with a stator coil 5, a radial bearing rotor yoke 4 secured to the rotary shaft 1, and a radial displacement sensor 6. The thrust magnetic bearing comprises a thrust bearing rotor 10 secured to the rotary shaft 1 and a pair of thrust bearing stators 11 secured to the casing 7 in such a manner that the stators 11 face each other across the rotor 10, each stator being provided with a stator coil 12, and an axial displacement sensor 13 provided at the end of the rotary shaft 1. The reference numeral 2 denotes an emergency rolling bearing.

Although two different kinds of bearing, that is, the radial bearings each comprising the bearing members 3, 4, 5 and 6 and the thrust bearing comprising the bearing members 10, 11, 12 and 13, are shown in FIG. 3, an explanation will be given in regard to the radial bearings alone since these two kinds of bearing may be controlled by the same control method.

In each radial bearing, the displacement sensor 6 measures relative displacement between the bearing rotor yoke 4 secured to the rotary shaft 1 and the bearing stators 3 each provided with a coil 5 for generating magnetomotive force, and a control current is applied to each coil 5 so that the distance between the yoke 4 and the stators 3 is maintained at a constant level.

FIG. 4 is a circuit diagram of a conventional controller for controlling the supply of current to the above-described coils 5. Referring to the figure, a signal output from the displacement sensor 6 is passed through a compensation circuit 21 and a power amplifier 22 to supply a control circuit to the stator coils 5e and 5f and, at the same time, a direct current from a DC power supply 23 is constantly supplied to the stator coils 5c and 5d to ensure linearity for control purposes.

Thus, in the conventional magnetic bearing controller, a relatively large current is constantly supplied to the stator coils from a DC power supply in order to realize linear control, and this leads to various problems, that is, generation of heat in the coil, power loss in the control system, generation of heat in the rotor due to eddy-current loss in the rotor, and unstable vibration of the rotary shaft.

SUMMARY OF THE INVENTION

Under these circumstances, it is a primary object of the present invention to provide a magnetic bearing controller which is free from the above-described problems of the prior art.

To this end, according to the present invention, no bias coils of a type equivalent to the coils for the DC power supply heretofore employed are used. Instead only one pair of stator coils per control axis is employed. The power amplifier which is connected to the two coils comprises two operational amplifiers which are supplied with a signal output from the compensation circuit and two power transistors for amplifying the respective outputs of the two operational amplifiers. The signal output from the compensation circuit is input to both the non-inverting input terminal of one operational amplifier and the inverting input terminal of the other operational amplifier and an exciting coil bias voltage is input to the respective inverting input terminals of the two operational amplifiers in parallel to the input signal. Thus, it is possible to control the position of the rotary shaft without the need to constantly supply bias current. In addition, the compensation circuit is arranged to have non-linear amplification characteristics so that it is possible to weaken the non-linear characteristics of the entire control circuit at times when a high current flows through the coils.

By virtue of the above-described arrangement, a signal output from the displacement sensor which is proportional to the relative displacement between the rotary shaft and the casing is first intput to the compensation circuit where gain and phase compensation is effected and then the signal is input to both the non-inverting input terminal of one operational amplifier and the inverting input terminal of the other operational amplifier. In addition, a signal for an exciting coil bias current is input to the respective inverting input terminals of the two operational amplifiers in parallel to the input signal. Thus, the two different kinds of input signal, that is, the signal output from the compensation circuit and the signal for bias current act an each other in such a manner that, when a current component which is proportional to the output of the compensation circuit, that is, control current, exceeds the bias current, either one of the coil currents flowing through the pair of stator coils is temporarily cut off; whereas when the control current is smaller than the bias current, either one of the two coils is supplied with a smaller current than the bias current. Accordingly, it is possible to minimize the amount of heat generated in the coils and the power loss in the control system and also to lower the magnetic flux density in the magnetic bearing. Therefore, the eddy-current loss in the rotor is minimized and the degree of unstable vibration of the rotary shaft due to the eddy-current loss is reduced.

If the compensation circuit in the control circuit is arranged to have certain non-linear amplification characteristics so that the amplification factor in a voltage region above a voltage corresponding to the exciting coil bias current is smaller than the amplification factor in a voltage region below said voltage, the compensation circuit can be provided with soft spring characteristics. Accordingly, the hard spring characteristics between the exciting current and the magnetic attraction force can be canceled by the soft spring characteristics of the compensation circuit. Thus, there is no jump in amplitude in the vicinity of the critical speed of the rotary shaft and it is possible to readily pass the critical speed. It is thus possible to obtain stable rotation of the rotary shaft which is resistant to vibrations.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DESCRIPTION OF THE PREFERRED EMBODIMENT

One embodiment of the present invention will be described hereinunder in more detail with reference to the accompanying drawings.

Figure 1:
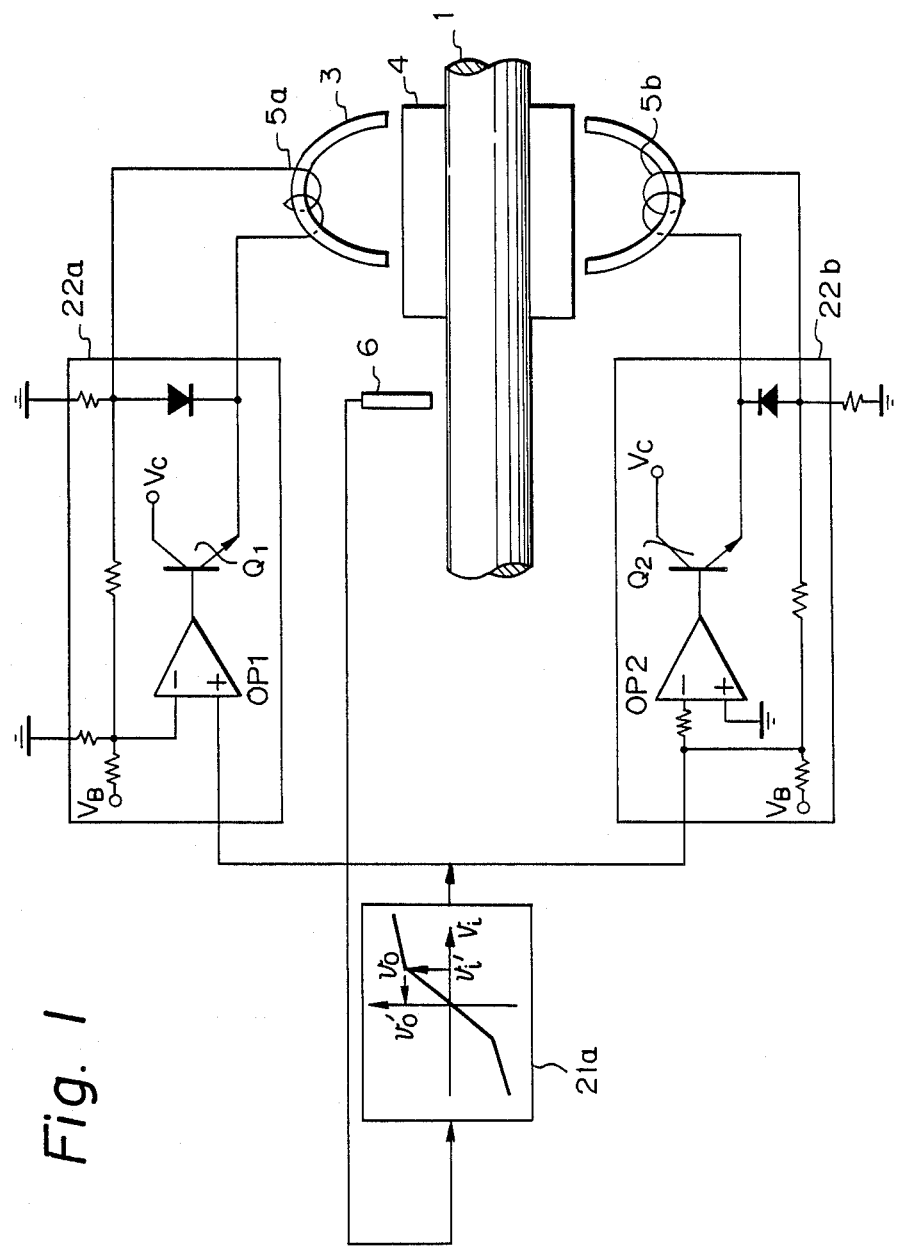
FIG. 1 shows the arrangement of an essential part of one embodiment in which the magnetic bearing controller according to the present invention is applied to a radial magnetic bearing.
Figure 4:
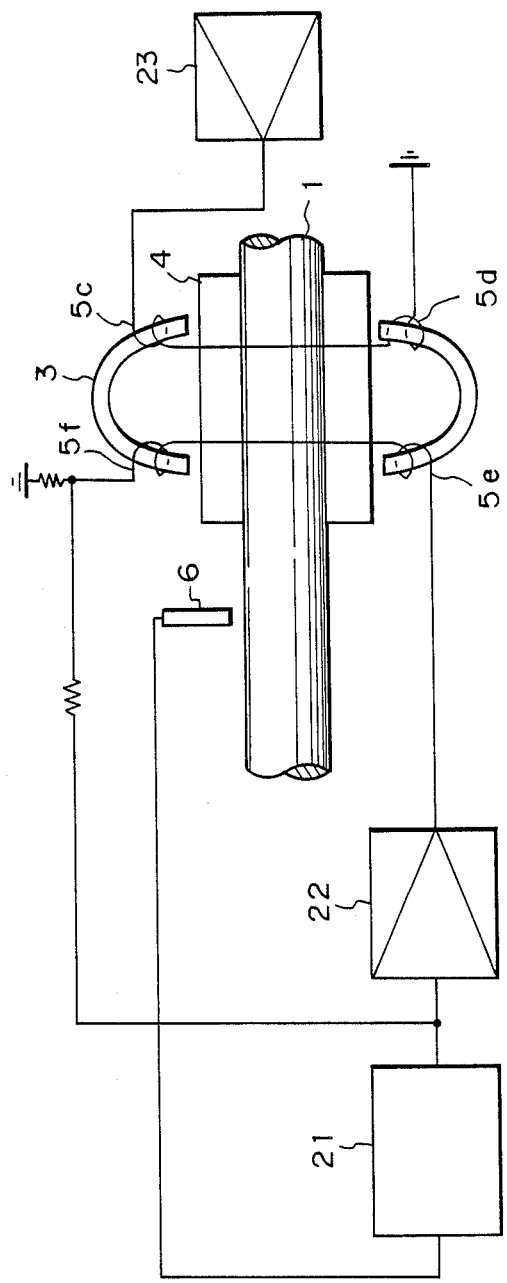
FIG. 4 shows the arrangement of a conventional radial bearing controller.

Referring first to FIG. 1, which shows the arrangement of an essential part of one embodiment in which the magnetic bearing controller according to the present invention is applied to a radial magnetic bearing, the same reference numerals as those shown in FIG. 4 are used to denote the same or like portions or members. It should be noted that the present invention may also be applied to a thrust magnetic bearing in the same way as in the case of a radial magnetic bearing.

In the figure, reference numeral 1 denotes a rotary shaft, 3 a pair of magnetic bearing stators rigidly secured to a casing, 4 a magnetic bearing rotor yoke rigidly secured to the rotary shaft 1, and 5a, 5b exciting coils.

A displacement sensor 6 delivers an output which is proportional to the relative displacement between the rotary yoke 4 and the stators 3. The output of the displacement sensor 6 is input to a compensation circuit 21a where gain and phase compensation is effected. The compensation circuit 21a is arranged to have amplification characteristics represented by a polygonal line such as that shown in the block that indicates the compensation circuit 21a, with the voltage $v_o$ being set to $v'_o$ at the voltage $v'_i$ which corresponds to the bias current supplied to the coils 5a and 5b.

Figure 2A:
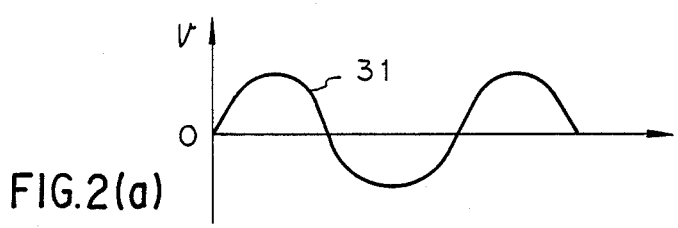
FIGS. 2(a) to 2(d) are graphs showing characteristic curves of a control circuit employed in the controller according to the present invention.
Figure 2B:
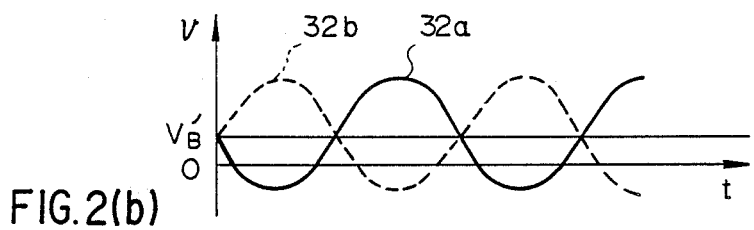
Figure 2C:
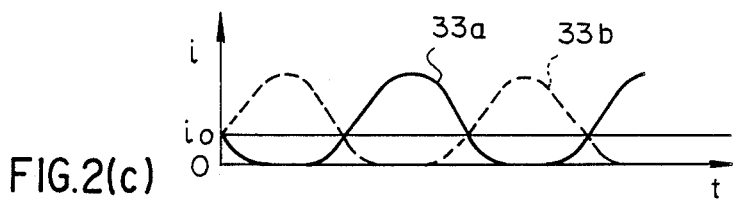

The output of the compensation circuit 21a is led to two power amplifiers 22a and 22b. These power amplifiers 22a and 22b have the same arrangement. More specifically, the power amplifier 22a comprises an operational amplifier OP1 and a power transistor $Q_1$, and the power amplifier 22b similarly comprises an operational amplifier OP2 and a power transistor $Q_2$. The output of the compensation circuit 21a is supplied to both the non-inverting input terminal (+) of the operational amplifier OP1 and the inverting input terminal (−) of the operational amplifier OP2, and a bias voltage $V_B$ is supplied to the respective inverting input terminals (−) of the operational amplifiers OP1 and OP2. As a result, if the output voltage of the displacement sensor 6, that is, the output of the compensation circuit 21a, is represented by the curve 31 shown in FIG. 2(a), the outputs of the operational amplifiers OP1 and OP2 are represented by the respective curves 32a and 32b shown in FIG. 2(b), so that the currents flowing through the coils 5a and 5b are represented by the respective curves 33a and 33b shown in FIG. 2(c). In FIGS. 2(a) to 2(c), the abscissa axis represents time, and $i_o$ shown in FIG. 2(c) denotes the coil bias current.

The magnetic attraction force F that acts between the magnetic bearing rotor yoke 4 and the stators 3 may be expressed as follows:

$$F = K i_{33b}^2 - K i_{33a}^2 \qquad (a)$$

In the above expression, $i_{33a}$ and $i_{33b}$ denote currents respectively flowing through the coils 5a and 5b. If the current components in each current which is proportional to the output of the compensation circuit 21a is represented by $i_a$, the currents flowing through the coils 5a and 5b are expressed as follows:

$$
\begin{aligned}
i_{33a} &= i_o - i_a \; (i_o - i_a \geq 0) & \text{(b)} \\
&= 0 \; (i_o - i_a < 0) & \text{(c)} \\
i_{33b} &= i_o + i_a \; (i_o + i_a \geq 0) & \text{(d)} \\
&= 0 \; (i_o + i_a < 0) & \text{(e)}
\end{aligned}
$$

Hence, the expression (a) may be rearranged as follows:

$$
\begin{aligned}
F &= 4K i_o i_a \; (|i_a| \leq i_o) & \text{(b)} \\
&= -K(i_o - i_a)^2 \; (i_a < -i_o) & \text{(c)} \\
&= K(i_o + i_a)^2 \; (i_a > i_o) & \text{(d)}
\end{aligned}
$$

$$
\begin{aligned}
\therefore \quad \frac{\partial F}{\partial i_a} &= 4K i_o & (|i_a| \leq i_o) \\
\frac{\partial F}{\partial i_a} &= -2K(i_a - i_o) & (i_a < -i_o) \\
\frac{\partial F}{\partial i_a} &= 2K(i_a + i_o) & (i_a > i_o)
\end{aligned}
$$

Figure 2D:
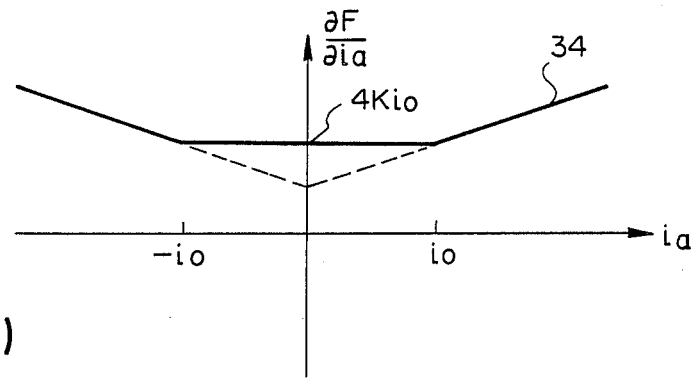
Figure 3:
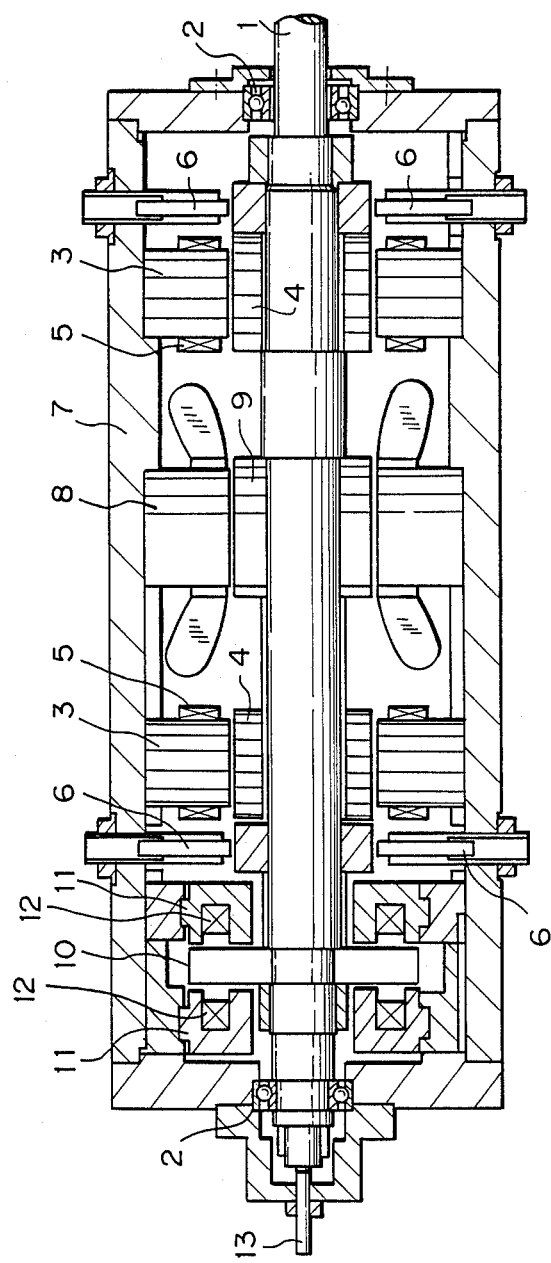
FIG. 3 is a vertical sectional view showing a spindle which is supported by a conventional quinaxial control magnetic bearing system that employs electromagnets.

The above-described characteristics, that is, rigidity characteristics between the control current $i_a$ and the magnetic attraction force F, may be represented by the curve 34 shown in FIG. 2(d). More specifically, the curve representing the rigidity characteristics between the magnetic attraction force F and the current $i_a$ is polygonal. In this case, however, when the control current, that is, the current component $i_a$ which is proportional to the output of the compensation circuit 21a, exceeds the bias current $i_o$, either the coil current $i_{33a}$ for the coil 5a or the coil current $i_{33b}$ for the coil 5b becomes temporarily zero, that is, the coil current is temporarily cut off, as will be clear from the expression (c). Similarly, when the control current $i_a$ is smaller than $i_o$, either one of the coils 5a and 5b is supplied with a current which is smaller than the bias current $i_o$. Accordingly, the amount of heat generated in the coils is minimized and the power loss in the control system is reduced. In addition, it is possible to lower the magnetic flux density in the magnetic bearing.

Thus, the eddy-current loss in the rotor is minimized and it is possible to reduce unstable vibration of the rotary shaft which is attributable to the eddy-current loss.

Figure 6:
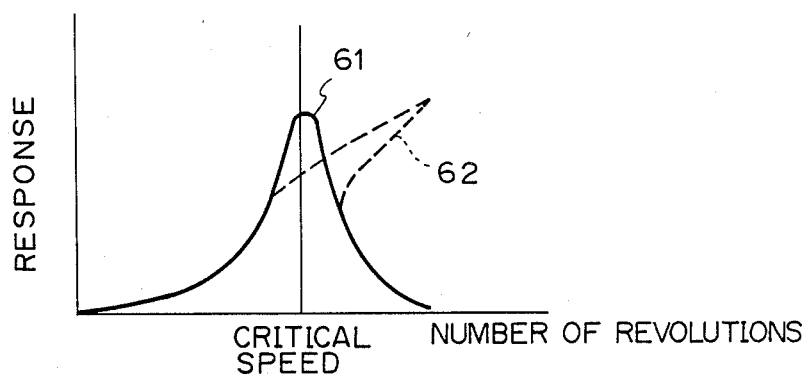
FIG. 6 is a chart showing the response curves of two different types of spring.

In the prior art, since the compensation circuit 21a is used with linear amplification characteristics, the relative displacement x between the magnetic bearing rotor and the stators and the control current $i_a$ are proportional to each other. Therefore, if a compensation circuit with such linear amplification characteristics is employed, the magnetic bearing has hard spring characteristics since $\partial F/\partial i_a$ has polygonal characteristics as shown by the curve 34 in FIG. 2(d), that is, it rises in a region where the control current $i_a$ is greater than the bias current $i_o$. Accordingly, when the number of revolutions of the rotary shaft passes the critical speed, the response shows characteristics such as those shown in FIG. 6, so that it is difficult to pass the critical speed. In FIG. 6, the reference numeral 61 denotes the response curve of the linear spring, while the numeral 62 denotes the response curve of the hard spring.

Figure 5A:
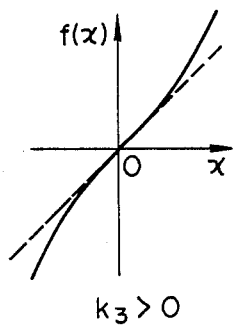
FIGS. 5(a) to 5(c) are charts showing characteristic curves of three different types of spring.

The above-described hard spring characteristics will be briefly explained below. If the restoring force of a spring with respect to the elongation x is represented by f(x), springs generally show characteristics such as those shown in FIGS. 5(a) to 5(c). If these characteristics are expressed by $f(x) = K_1 X + K_3 X^3$ ($K_1 > 0$), the spring characteristics shown in FIGS. 5(a), 5(b) and 5(c) respectively correspond to the conditions $K_3 > 0$, $K_3 > 0$ and $K_3 = 0$. The hard spring characteristics correspond to those shown in FIG. 5(a).

Figure 5B:
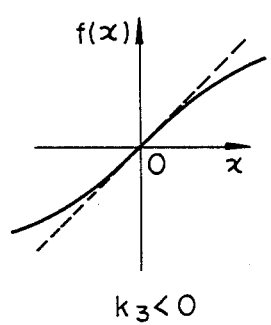
Figure 5C:
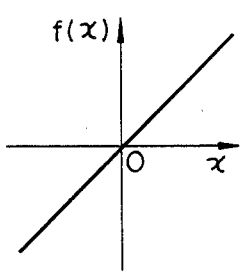

Accordingly, in the present invention the compensation circuit 21a is arranged to have soft spring characteristics such as those represented by the polygonal line in the block that indicates the circuit 21a, that is, spring characteristics corresponding to the condition $K_3 > 0$ shown in FIG. 5(b). Thus, the hard spring characteristics between the exciting current and the magnetic attraction force, such as those shown in FIG. 2(d), can be cancelled by the soft spring characteristics of the compensation circuit 21a, so that it is possible to weaken the hard spring characteristics shown by the curve 34 in FIG. 2(d). It should be noted $v'_i$ shown in the block of FIG. 1 that indicates the compensation circuit 21a corresponds to the bias current $i_o$ shown in FIGS. 2(b) to 2(d).

Thus, it becomes easy to pass the critical speed of the rotary shift.

As has been described above, according to the present invention, the signal output from the compensation circuit is input to both the non-inverting input terminal of one operational amplifier and the inverting input terminal of the other operational amplifier, and a signal for the exciting coil bias current is input to these operational amplifiers in parallel to the input signal, so that it temporarily becomes unnecessary to supply any current to either one of the two coils provided to control the motion of the rotary shaft in one direction, or only necessary to supply a lower current than the bias current. Accordingly, the level of current which needs to be supplied to the exciting coils is reduced, so that the amount of heat generated in the coils is minimized and the power loss in the control system is also reduced, thus it is possible to increase the efficiency of the system. Since the magnetic flux density at the area between the rotor and the stator is also reduced, the amount of heat generated in the rotor due to eddy-current loss is minimized, too, and the force which is produced in the rotor by eddy current and which will act to make the rotary shaft unstable is also reduced, so that it is possible to realize a rotary shaft which is stable in the face of vibrations.

If the compensation circuit is arranged to have non-linear amplification characteristics, the hard spring characteristics between the exciting current and the magnetic attraction force can be cancelled by the soft spring characteristics of the compensation circuit. It is therefore possible to control the magnetic bearing system with a reduced bias current. Accordingly, the level of current which needs to be supplied to the exciting coils is lowered further and hence the above-described effect is enhanced. Since the hard spring characteristics can be weakened, it is possible to readily pass the critical speed of the rotary shaft.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A controller for a magnetic bearing system of the type having a rotor yoke made of a magnetic material which is rigidly secured to a rotary shaft, a pair of electromagnet stators rigidly secured to a casing with a minute gap provided between the same and said rotor yoke, each stator having a coil for generating magnetomotive force, a displacement sensor for measuring relative displacement between said rotary shaft and said casing, and a combination of a compensation circuit and a power amplifier for controlling the level of magnetic attraction force acting between said rotor yoke and said pair of electromagnet stators on the basis of a signal output from said displacement sensor, said controller comprising:

said power amplifier including two operational amplifiers which are supplied with a signal output from said compensation circuit and two power transistors for amplifying the respective outputs of said operational amplifiers, wherein the signal output from said compensation circuit is input to both the non-inverting input terminal of one of said operational amplifiers and the inverting input terminal of the other operational amplifier, and an exciting coil bias voltage is input to the respective inverting input terminals of the two operational amplifiers in parallel to said input signal.

2. A controller according to claim 1, wherein said compensation circuit has such non-linear amplification characteristics designed to ensure that the amplification factor in a voltage region above a voltage corresponding to an exciting coil bias current is smaller than the amplification factor in a voltage region below said voltage.

3. A controller according to claim 1, wherein said compensation circuit has such polygonal amplification characteristics designed to ensure that the amplification factor of said compensation circuit changes at a voltage corresponding to an exciting coil bias current in such a manner that the amplification factor in a voltage region above said voltage is smaller than the amplification factor in a voltage region below said voltage.

4. A controller according to claim 1, wherein said pair of electromagnet stators are disposed in symmetry with each other with respect to the axis of said rotary shaft at the radial outside of said rotor yoke so that a pair of electromagnets and said rotor yoke constitute in combination a radial magnetic bearing, said displacement sensor being arranged to measure a radial relative displacement between said rotary shaft and said casing in the direction which intersects the pair of electromagnets.

5. A controller according to claim 1, wherein the rotor yoke secured to said rotary shaft has a disk-shaped configuration and the pair of electromagnet stators are aligned with each other in the axial direction of said rotary shaft at both sides, respectively, of said rotor yoke in the axial direction thereof so that a pair of electromagnets and said rotor yoke constitute in combination a thrust magnetic bearing, said displacement sensor being arranged to measure an axial relative displacement between said rotary shaft and said casing in the direction which intersects the pair of electromagnets.

* * * * *